(No Model.)
W. N. SPRINGER.
THRASHING MACHINE.
No. 518,706. Patented Apr. 24, 1894.
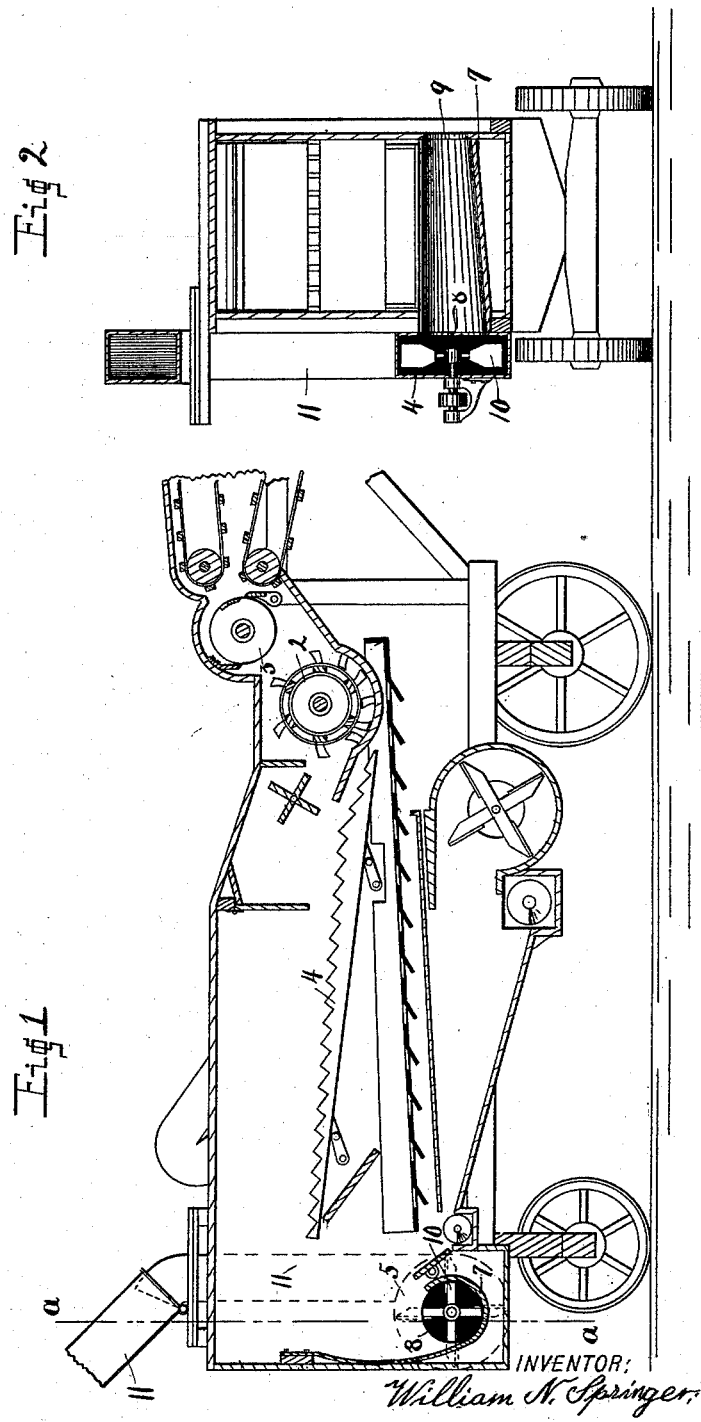
WITNESSES:
A. M. Hood.
E. K. Hood.
INVENTOR:
William N. Springer,
BY H. P. Hood,
ATTORNEY.

UNITED STATES PATENT OFFICE.

WILLIAM N. SPRINGER, OF FORTVILLE, ASSIGNOR TO THE SPRINGER AUTOMATIC THRASHER COMPANY, OF ANDERSON, INDIANA.

THRASHING-MACHINE.

SPECIFICATION forming part of Letters Patent No. 518,706, dated April 24, 1894.

Application filed August 16, 1893. Serial No. 483,266. (No model.)

*To all whom it may concern:*

Be it known that I, WILLIAM N. SPRINGER, a citizen of the United States, residing at Fortville, in the county of Hancock and State of Indiana, have invented a new and useful Thrashing-Machine, of which the following is a specification.

My invention relates to an improvement in a thrashing machine for which Letters Patent No. 502,473 were issued to me August 1, 1893.

In the thrashing machine shown in said Letters Patent the straw is cut into short lengths, before it reaches the thrashing-cylinder, and is delivered from the separating mechanism into a closed chamber, from whence it is drawn by means of an exhaust-fan, and is discharged through a pneumatic-tube. It is found in practice that the maintenance of an exhaust-fan in connection with an entirely closed chamber which receives the straw after separation, affects injuriously the separation of the grain from the straw and chaff, a portion of the grain being drawn over with the straw and chaff, and eddies being formed in the chamber which tend to clog the operation of the fan.

The object of my present improvement is, to remedy this difficulty.

Figure 1 represents a central longitudinal section of the machine. Fig. 2 represents a transverse section at —a— Fig. 1.

In the drawings, 2, indicates the thrashing-cylinder, 3, the revolving cutter-head, 4, the rake bar and separating mechanism, and, 5, the exhaust fan. The straw and chaff are delivered from the separating mechanism into a tubular receiver, 7, formed, preferably, of sheet metal, open along its upper side and at both ends. Said receiver extends across the interior of the otherwise closed chamber at the end of the thrasher-casing and communicates at one end with the eye of the fan chamber, 8, which is mounted on the exterior of the thrasher-casing at one side, and at the other end communicates with an opening, 9, formed in the opposite side of the casing. The exhaust-fan, 10, is arranged to revolve in a vertical plane in the fan chamber, so as to expel the straw and chaff therein, through the tube, 11. By this construction, when the fan is put in motion, a strong current of air is established from the exterior, through the opening 9 and the tubular receiver 7, across the interior of the casing, toward the fan. The straw and chaff fall from the separating mechanism into said air-current and pass into the fan and from thence out through the tube 11 to the stack.

I claim as my invention—

1. In a thrashing machine, the combination with the thrashing cylinder, a cutter arranged to cut the straw into short lengths on its way to said cylinder, and suitable separating mechanism and its inclosing casing arranged to receive the straw and grain after they leave the thrashing cylinder, and terminating in an otherwise closed chamber of an exhaust-fan mounted upon one side of said casing, a tubular receiver open at its upper side and arranged to receive the straw and chaff from the separating mechanism, one end of said receiver being connected with the eye of the exhaust-fan and the other being open and communicating with the exterior through the casing, all arranged to co-operate substantially as set forth.

2. In a thrashing machine, the combination with the separating mechanism and its inclosing casing, terminating in an otherwise closed chamber of an exhaust-fan mounted upon one side of said casing, a tubular receiver open on its upper side and arranged to receive the straw and chaff from the separating mechanism, one end of said receiver being connected with the eye of the exhaust-fan and the other being open and communicating with the exterior through the casing, all arranged to co-operate substantially as set forth, whereby a current of air is established from the exterior across the interior of the thrasher-casing for the purpose set forth.

WILLIAM N. SPRINGER.

Witnesses:
B. A. BROWN,
A. M. HOOD.